April 10, 1928.
L. H. GILLICK
FLEXIBLE JOINT
Original Filed July 26, 1920
1,665,810
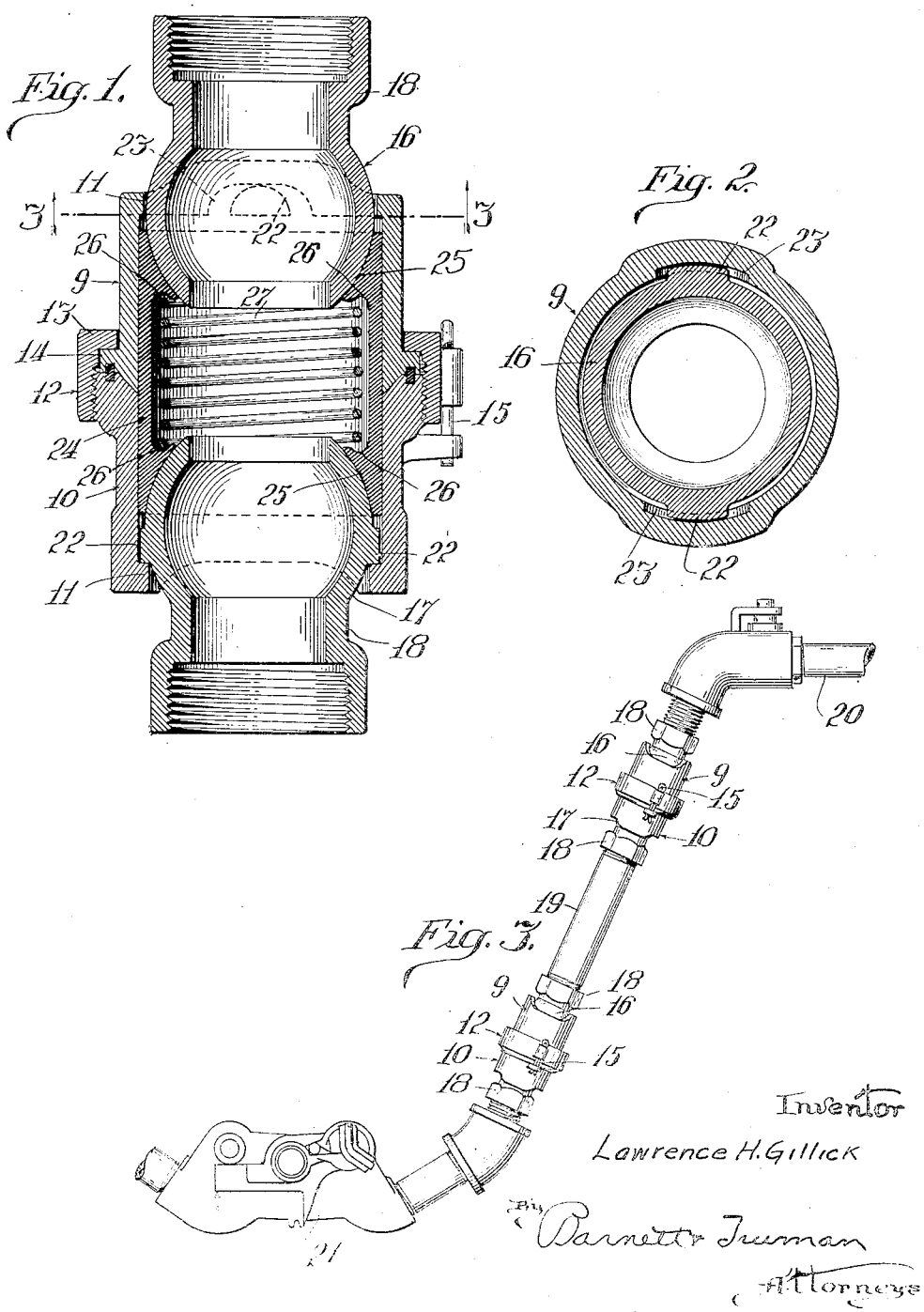
Inventor
Lawrence H. Gillick
By Barnett & Truman
Attorneys

Patented Apr. 10, 1928.  1,665,810

UNITED STATES PATENT OFFICE.

LAWRENCE H. GILLICK, OF ST. PAUL, MINNESOTA, ASSIGNOR TO VAPOR CAR HEATING COMPANY, INC., OF CHICAGO, ILLINOIS, A CORPORATION OF NEW YORK.

FLEXIBLE JOINT.

Original application filed July 26, 1920, Serial No. 398,882. Divided and this application filed July 2, 1925. Serial No. 41,053.

My invention relates to flexible couplings or pipe joints of the type employing ball and socket members, the joint being intended especially for conduits subject to rather high internal fluid pressure. The primary objects of the invention are: To provide a joint which will be flexible even when the fluid pressure therein is very high, and which will also be fluid tight and so remain after continued periods of service; to provide a joint which can be re-packed, when necessary, without disconnecting the flexible joint structure entirely from the conduit or pipe line with which it is associated; to provide a joint, the members of which will have a wider range of angular movement than possessed by the usual so-called universal joints; to provide a simple arrangement whereby the members of the joint will have capacity for swivel movement, as between each other, as well as angular movement; to construct and dispose the parts of the joint so that the weight of the parts is not imposed on the packing whereby easy flexibility is insured and the packing has capacity for self-adjustment under fluid or spring pressure, or both, against the ball members of the joint; and in other respects to be hereinafter noted, to provide an improved flexible joint for use on railway trains, for example, in place of the usual rubber hose connecting the train pipe sections or in other situations where lightness, compact structure, strength and flexibility over wide ranges are requisite.

The invention is illustrated in certain preferred embodiments, in the accompanying drawing:

Fig. 1 is a longitudinal sectional view through my improved joint structure.

Fig. 2 is a transverse section taken on line 2—2 of Fig. 1; and

Fig. 3 is a fragmentary view in side elevation showing a train line connection comprising my improved flexible joint structure.

Referring to the several figures of the drawing,—9 and 10 indicate socket members, each of internally cylindrical form with an inwardly extending flange 11 at one end, said two members being secured together by a union 12 mounted by means of screw threads upon the section 10 and having an inwardly extending flange 13 in engagement with an outwardly extending flange 14 formed on the section 9. The union 12 is held from loosening on the section 10 by means of a cotter pin 15 passing through suitable openings in the two parts.

Within the socket formed by the members 9 and 10, I have provided two ball or globular members 16 and 17, one at each end of the socket, the ball members being provided with neck portions 18 for connection to the adjacent portions of the pipe connection. In Fig. 3, I have shown a portion of an all-metal flexible pipe connection between the steam train pipes of two railway cars and embodying my improved construction. In this construction, two of the flexible joint structures are employed, connected together by means of a pipe 19, the end portion of a train pipe 20 being shown at the top and a hose coupler 21 at the bottom.

The ball members 16 and 17 are held adjustably in position within the socket by means of circular lugs 22 which project at opposite sides of the ball members into elongated notches or recesses 23 formed on the inner faces of the flanges 11, the arrangement being such that the ball is able to have either a swinging motion about the lugs 22 or a swiveling motion about the longitudinal axis of the socket. The lugs 22 and recesses 23 for one ball are preferably arranged at right-angles to the lugs and recesses for the other ball.

Between the inner ends of the ball members 16 and 17, I have provided a packing member or gasket 24. This gasket is formed with two curved surfaces 25 at its opposite ends for bearing against the outer surfaces of the ball members, the inner face of the gasket being provided with undercut grooves 26 in which are seated the ends of the coiled spring 27. This gasket is to be formed of rubber, rubber composition or other material of a type that is soft and resilient as compared with the metal parts of the device, or of a type that will soften under the influence of heat under conditions such as exitsts in a train pipe joint in use.

By the use of the spring 27, taken in connection with the force of the fluid pressure upon the shoulders of the gasket forming the grooves 26, the faces 25 of the gasket are kept in contact with the ball members as wear takes place, the force of the spring and the fluid pressure serving to elongate the gasket slightly as may be necessary for effecting this result. The fluid pressure serves likewise for holding the gasket pressed outwardly against the inner face of the socket, serving to render the joint leakproof.

With a joint so constructed, the angular movement of each ball member with respect to the socket member may be considerable, because the socket member does not directly engage the ball members (the engagement between them being made by the lug and recess connection,) so that the portions of the socket member limiting the angular movements of the ball member need not project beyond, or even to, the line of maximum transverse diameter of the ball member.

The pivotal connections between the socket members and the ball members takes the stress as between said members which results from the internal fluid pressure, and also relieves the gaskets of the weight of the parts of the joint. This gives the joint easy flexibility even when the internal pressure is high, since the articulated parts, the ball and socket members, do not bear on each other at all in the sense that the ordinary ball and socket members bear upon each other, the engagement between the socket and the balls being limited to the pivotal connections by which the friction is minimized. In this construction, the packing is self-feeding and self-adjusting against the surfaces of the ball members, so that wear on the gaskets does not bring about a leaky condition of the joint.

This application is being filed as a division of my co-pending application, Serial No. 398,882, filed July 26, 1920.

I claim:

1. In a flexible pipe joint, the combination of a socket member having an elongated socket cavity, ball members extending into opposite ends of the socket cavity, means for flexibly connecting the ball members with the socket member, a single longitudinally extensible annular packing member of less length than the socket cavity and bodily movable longitudinally within the socket and having end portions which are forced into the spaces between the ball members and the socket member and having curved surfaces bearing against said ball members, respectively, said packing member being formed with shoulders adjacent to said curved surfaces, and a spring interposed between said shoulders.

2. In a flexible pipe joint, the combination of a socket member having an elongated socket cavity, ball members extending into opposite ends of the socket cavity, means for flexibly connecting the ball members with the socket member, an elongated annular gasket of less length than the socket cavity and mounted between said ball members and bodily movable longitudinally within the socket and having end portions shaped to wedge into the spaces between the inner ends of the ball members and the socket member, and a spring acting on said gasket serving to elongate the gasket and hold the end portions in operative contact with the ends of the ball members.

3. In a flexible pipe joint, the combination of a socket member having an elongated socket cavity, ball members extending into opposite ends of the socket cavity, means for flexibly connecting the ball members with the socket member, an elongated annular gasket of less length than the socket cavity and made of material which is soft and resilient when under the influence of steam, mounted between said ball members and bodily movable longitudinally within said socket, said gasket having its end portions curved to conform to the shape of the ball members and wedge into the spaces between the ball and socket members and being provided with shoulders on its inner face near its ends, and a spring interposed between said shoulders serving to stretch the gasket into operative engagement with the ball members.

4. In a flexible pipe joint, the combination of an internally cylindrical socket member, hollow globular ball members extending from said socket member at opposite ends thereof, means for flexibly connecting the ball members with the socket member, a single annular packing member of less length than the internal length of the socket and bodily movable longitudinally within the socket and having globularly concaved end portions interposed between said ball members and the adjacent inner walls of the socket member, and a spring acting on said gasket serving to force the ends of the gasket into operative contact with the ends of the ball members.

5. In a flexible pipe joint, the combination of a socket member having an elongated socket cavity, ball members extending into opposite ends of the socket cavity, means for flexibly connecting the ball members with the socket member, a single annular packing member of less length than the socket cavity imperforate from end to end bodily movable longitudinally within the socket and interposed between said ball members and bearing at its ends against the ball members, and a spring serving to stretch the packing and press the ends of the packing against the ball members whereby the packing acts as a gasket forming a tight joint between the ball members.

6. A flexible joint comprising two internally cylindrical socket members, a ball member in the outer end of each socket member, means for preventing withdrawal of the ball members through the outer ends of the socket members and serving to permit a limited swinging motion and a limited rotary motion of the ball members within the socket members, means for securing said two socket members releasably together to form a single cylindrical socket cavity, and a single longitudinally extensible annular packing member of less length than the socket cavity and imperforate from end to end bodily movable within the connected socket members and interposed between said ball members and bearing at its ends against the ball members serving to form a tight joint therewith.

7. A flexible joint comprising two internally cylindrical socket members, a ball member in the outer end of each socket member, means for preventing withdrawal of the ball members through the outer ends of the socket members and serving to permit a limited swinging motion and a limited rotary motion of the ball members within the socket members, means for securing said two socket members releasably together, a single annular packing member having curved surfaces bearing against said ball members, respectively, said packing member being formed with shoulders adjacent to said curved surfaces, and a spring interposed between said shoulders.

8. A flexible joint comprising two internally cylindrical socket members, a ball member in the outer end of each socket member, means for preventing withdrawal of the ball members through the outer ends of the socket members and serving to permit a limited swinging motion and a limited rotary motion of the ball members within the socket members, means for securing said two socket members releasably together, an elongated annular gasket made of material which is soft and resilient when under the influence of steam, mounted between said ball members within said socket, said gasket having its end portions curved to conform to the shape of the ball members and being provided with shoulders on its inner face near its ends, and a spring interposed between said shoulders serving to set the gasket into operative engagement with the ball members.

9. In a flexible pipe joint, the combination of an internally cylindrical socket member, pipe members having ends projecting into the opposite ends of the socket member, means for articulating these pipe ends in the socket member, a single externally cylindrical longitudinally extensible annular gasket member of less length than the internal length of the socket member and slidably fitting for bodily longitudinal movement within the socket member, and having enlarged ends shaped to wedge into the spaces between the socket and pipe ends, and a spring confined between the enlarged end portions of the gasket to elongate the gasket and hold the enlarged ends in engagement with the pipe ends.

10. In a flexible pipe joint, the combination of an internally cylindrical socket member, ball members extending into opposite ends of the socket member, means for flexibly connecting the ball members with the socket member, and a single externally cylindrical resilient annular packing member of less length than the internal length of the socket member and fitting within the socket with capacity for free bodily longitudinal sliding movement toward or from either ball, the ends of said packing member which fit between the ball and socket members being formed with curved end surfaces bearing against said ball members respectively.

LAWRENCE H. GILLICK.